(12) United States Patent
Takii

(10) Patent No.: US 10,562,572 B2
(45) Date of Patent: Feb. 18, 2020

(54) PILLAR FRAMEWORK STRUCTURE AND VEHICLE BODY MODULE STRUCTURE

(71) Applicant: TOYOTA JIDOSHA KABUSHIKI KAISHA, Toyota-shi (JP)

(72) Inventor: Shunsuke Takii, Aichi-gun (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 77 days.

(21) Appl. No.: 16/008,154

(22) Filed: Jun. 14, 2018

(65) Prior Publication Data

US 2019/0002032 A1 Jan. 3, 2019

(30) Foreign Application Priority Data

Jun. 29, 2017 (JP) ................. 2017-127818

(51) Int. Cl.
| | |
|---|---|
| B62D 25/14 | (2006.01) |
| B62D 25/04 | (2006.01) |
| B62D 27/06 | (2006.01) |
| B62D 29/00 | (2006.01) |
| B62D 25/08 | (2006.01) |
| B62D 27/02 | (2006.01) |

(52) U.S. Cl.
CPC ......... *B62D 25/145* (2013.01); *B62D 25/04* (2013.01); *B62D 25/081* (2013.01); *B62D 27/02* (2013.01); *B62D 27/065* (2013.01); *B62D 29/008* (2013.01)

(58) Field of Classification Search
CPC .... B62D 25/145; B62D 25/04; B62D 25/081; B62D 27/02; B62D 27/065; B62D 29/008
See application file for complete search history.

(56) References Cited

U.S. PATENT DOCUMENTS

| | | | |
|---|---|---|---|
| 9,193,390 B1 * | 11/2015 | Yoshida | B62D 29/008 |
| 2006/0237996 A1 | 10/2006 | Eipper et al. | |
| 2012/0193939 A1 | 8/2012 | Howe et al. | |
| 2012/0235401 A1 * | 9/2012 | Richardson | B62D 27/023 |
| | | | 285/285.1 |
| 2016/0280282 A1 * | 9/2016 | Nishimura | B62D 25/20 |
| 2017/0137066 A1 | 5/2017 | Ayuzawa et al. | |
| 2017/0253274 A1 | 9/2017 | Kawata et al. | |

FOREIGN PATENT DOCUMENTS

| | | |
|---|---|---|
| EP | 2 481 569 A1 | 8/2012 |
| JP | 2005-537179 | 12/2005 |
| WO | WO 2015/145891 A1 | 10/2015 |
| WO | WO 2016/042858 A1 | 3/2016 |

* cited by examiner

*Primary Examiner* — Lori L Lyjak
(74) *Attorney, Agent, or Firm* — Oblon, McClelland, Maier & Neustadt, L.L.P.

(57) ABSTRACT

There is provided a pillar framework structure including: a pillar lower that extends in a vehicle vertical direction; a joining member that is joined to an upper portion of the pillar lower and that is configured from die-cast aluminum; and a pillar upper that is joined to the joining member, and that extends in a vehicle upward direction and a vehicle rearward direction.

7 Claims, 6 Drawing Sheets

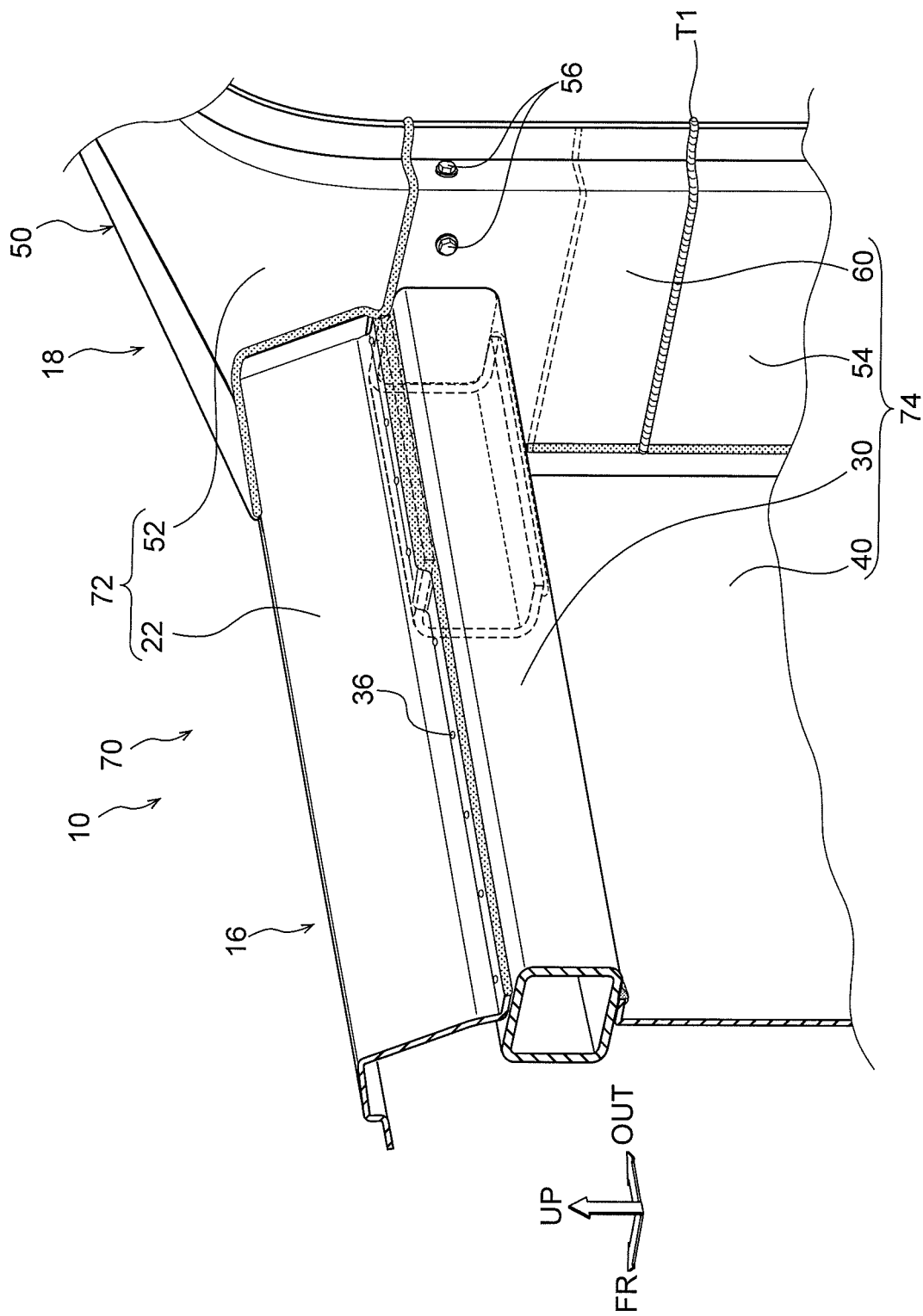

PILLAR FRAMEWORK STRUCTURE AND VEHICLE BODY MODULE STRUCTURE

CROSS-REFERENCE TO RELATED APPLICATION

This application is based on and claims priority under 35 USC 119 from Japanese Patent Application No. 2017-127818 filed on Jun. 29, 2017, the disclosure of which is incorporated by reference herein.

BACKGROUND

Technical Field

The present disclosure relates to a pillar framework structure and a vehicle body module structure.

Related Art

Japanese National-Phase Publication No. 2005-537179 discloses a body structure in which a roof module provided with front and rear roof columns (pillars) is placed on and connected to a base module provided with column portions, these being pillar lower sections. The front and rear roof columns of the roof module are connected to each other by corresponding cross members.

The connections between the respective framework members are made by adhesion or welding. For example, in a front pillar of the body structure of Japanese National-Phase Publication No. 2005-537179, a column portion extending in a vehicle upward direction from the base module, and a cross member extending in a vehicle width direction, are both joined to the front roof column by adhesion or welding.

In the body structure described above, the framework members are joined together through flanges. Flange joints are sometimes weak points from the perspective of securing coupling rigidity. Moreover, there is a concern that if the coupling rigidity is low, collision load might not be well-dispersed between the respective framework members in a collision.

SUMMARY

An object of the present disclosure is to provide a pillar framework structure and a vehicle body module structure capable of improving coupling rigidity when framework members are joined together, and also capable of dispersing collision load between the respective framework members in a collision.

A pillar framework structure of a first aspect includes a pillar lower, a joining member, and a pillar upper. The pillar lower extends in a vehicle vertical direction. The joining member is joined to an upper portion of the pillar lower and is configured from die-cast aluminum. The pillar upper is joined to the joining member, and extends in a vehicle upward direction and a vehicle rearward direction.

The pillar framework structure of the first aspect is applied to a pillar configured from the pillar lower and the pillar upper, these being framework members. In the pillar framework structure, the pillar lower and the pillar upper are both joined to the die-cast aluminum joining member. Note that in the pillar lower that extends in the vehicle vertical direction, an upper portion of the pillar lower configures a location joined to the joining member. In the pillar upper that extends in the vehicle upward direction and the vehicle rearward direction, a lower portion of the pillar upper configures a location joined to the joining member. Note that the lower portion configuring the joining location of the pillar upper may extend in the vehicle vertical direction. In the pillar framework structure of the first aspect, the pillar lower and the pillar upper are joined together through the joining member that configures a node. Namely, the pillar lower and the pillar upper are each joined to the joining member along a shear direction, thereby enabling coupling rigidity to be improved. Due to improving the coupling rigidity, collision load can be dispersed between the pillar lower and the pillar upper in a collision.

In a pillar framework structure of a second aspect, the joining member is provided with an extension portion extending toward a vehicle width direction inner side, and the extension portion is joined to an end portion of a cowl reinforcement extending in a vehicle width direction.

In the pillar framework structure of the second aspect, in addition to the pillar lower and the pillar upper, the cowl reinforcement that configures a framework member is also joined to the joining member. In the cowl reinforcement that extends in the vehicle width direction, a vehicle width direction outer side end portion of the cowl reinforcement configures a location joined to the joining member. The pillar framework structure of the second aspect enables coupling rigidity to be improved not only for the pillar lower and the pillar upper, but also for the cowl reinforcement. Moreover, collision load can also be dispersed into the cowl reinforcement in a collision.

In a pillar framework structure of a third aspect, in the joining member, each of a lower joining portion that is joined to the pillar lower in a state in which the pillar lower is inserted into the lower joining portion, an upper joining portion that is joined to the pillar upper in a state in which the pillar upper is inserted into the upper joining portion, and the extension portion, which is joined to the cowl reinforcement in a state in which the cowl reinforcement is inserted into the extension portion, is formed with a U-shaped cross-section profile as viewed along a respective insertion direction of the respective portion.

In the pillar framework structure of the third aspect, each framework member is joined to the die-cast aluminum joining member in a state in which the framework member is inserted into the joining member. The portion to which each framework member is joined is formed with a U-shaped cross-section profile as viewed along the insertion direction. Here, the "insertion direction" refers to the extension direction of the joining location between the framework member and the joining member. Namely, this is the vehicle vertical direction in the case of the pillar lower, the vehicle upward direction and vehicle rearward direction, or the vehicle vertical direction, in the case of the pillar upper, and is the vehicle width direction in the case of the cowl reinforcement. The pillar framework structure of the third aspect enables each framework member to be inserted through the open portion of the U-shaped cross-section profile as well as enabling insertion along the insertion direction of each framework member. Namely, assembly of the respective framework members to the joining member is facilitated. Moreover, the joining position of each framework member can be adjusted by adjusting the insertion position of the framework member to the joining member. Namely, adjustment of the joining positions is easier than in a pillar framework structure in which framework members are joined together using flanges.

A vehicle body module structure of a fourth aspect includes the pillar framework structure of any one of the first aspect to the third aspect. The vehicle body module structure includes a roof module including the pillar upper and an underside module including the pillar lower as plural vehicle body modules configuring a vehicle body. The roof module and the underside module are fastened together using a bolt to form a pillar that includes the pillar upper and the pillar lower.

The vehicle body module structure of the fourth aspect is applied to a vehicle configured from plural vehicle body modules. The roof module includes the pillar upper, and the underside module includes the pillar lower. In the vehicle body module structure of the fourth aspect, the pillar upper and the pillar lower can be joined together through the joining member by joining the vehicle body modules together. Namely, the pillar is formed when the vehicle body modules are joined together. The vehicle body module structure of the fourth aspect reduces the number of manufacturing processes of the vehicle. Moreover, the coupling rigidity of the respective framework members joined to the joining member can be improved, and collision load can be dispersed into the respective framework members in a collision.

The present disclosure is capable of improving coupling rigidity when framework members are joined together, and also capable of dispersing collision load between the respective framework members in a collision.

BRIEF DESCRIPTION OF THE DRAWINGS

Exemplary embodiments of the present disclosure will be described in detail based on the following figures, wherein:

FIG. 6 is a perspective view illustrating a pillar framework structure according to an exemplary embodiment of the present disclosure in a state applied to a vehicle body module structure.

DETAILED DESCRIPTION

Figure 1:
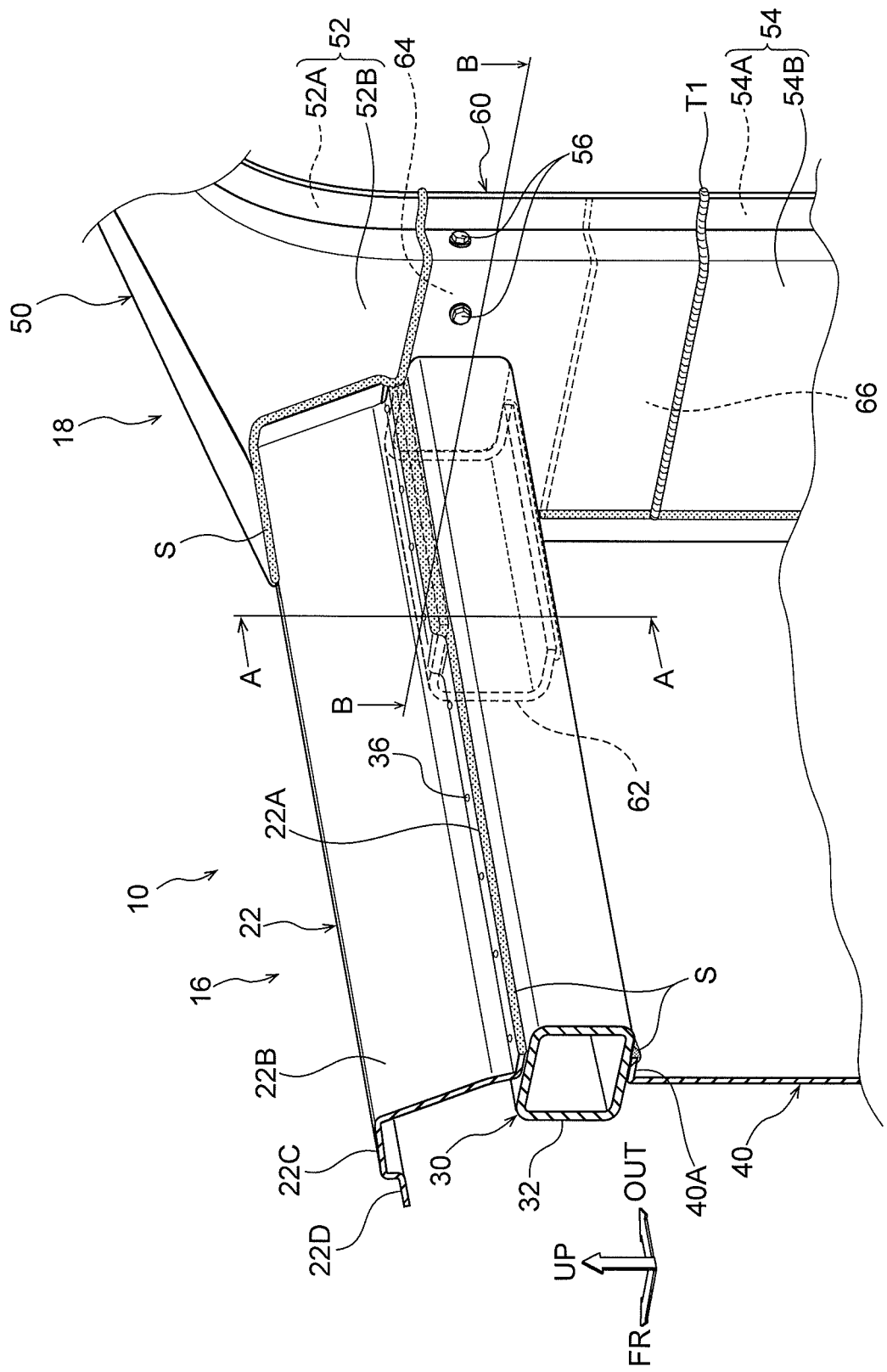
FIG. 1 is a perspective view illustrating a cowl section and a front pillar of a pillar framework structure according to an exemplary embodiment of the present disclosure, as viewed from a vehicle width direction inner side and vehicle rear side.
Figure 2:
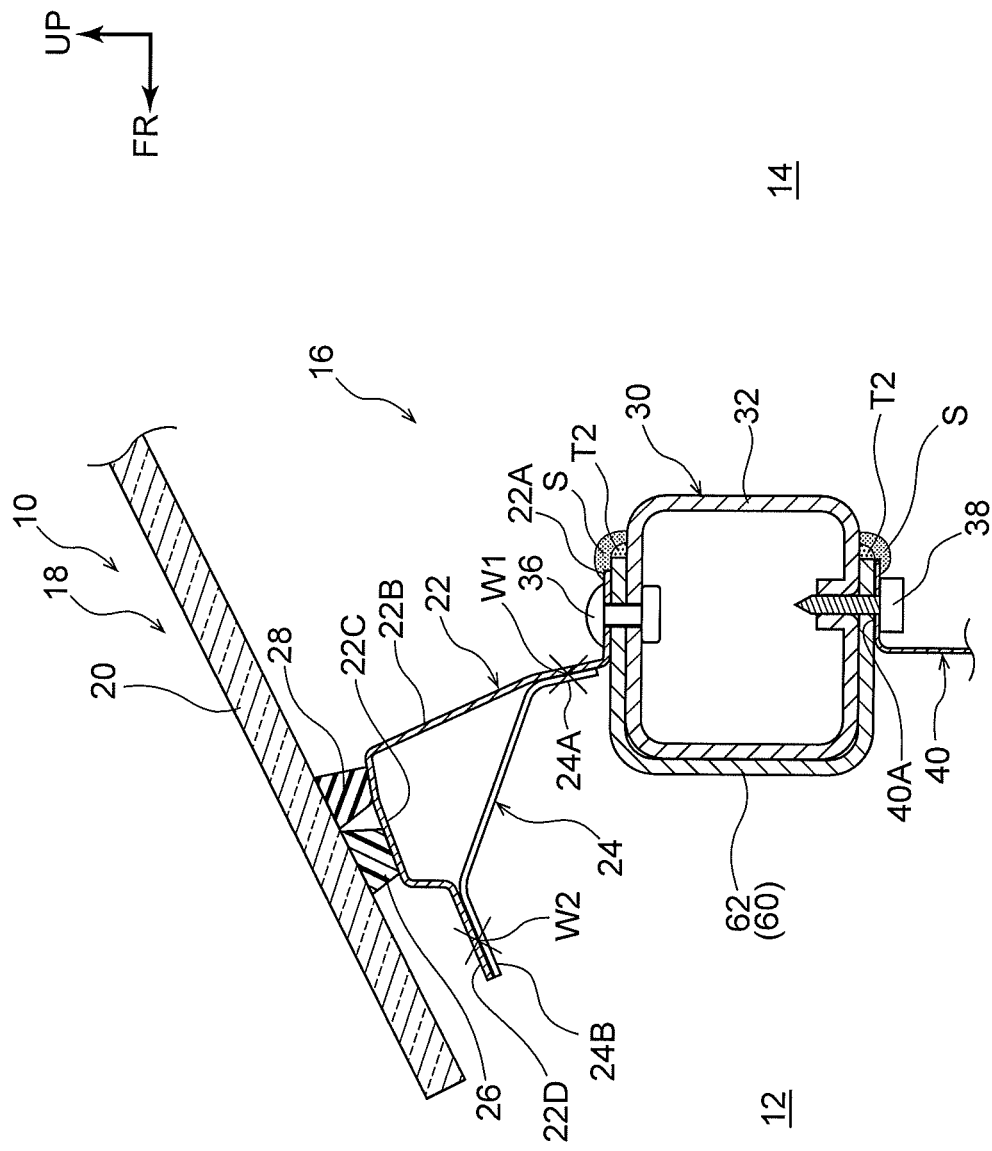
FIG. 2 is a side view cross-section (a cross-section taken along A-A in FIG. 1) of a cowl section of a pillar framework structure according to an exemplary embodiment of the present disclosure.
Figure 3:
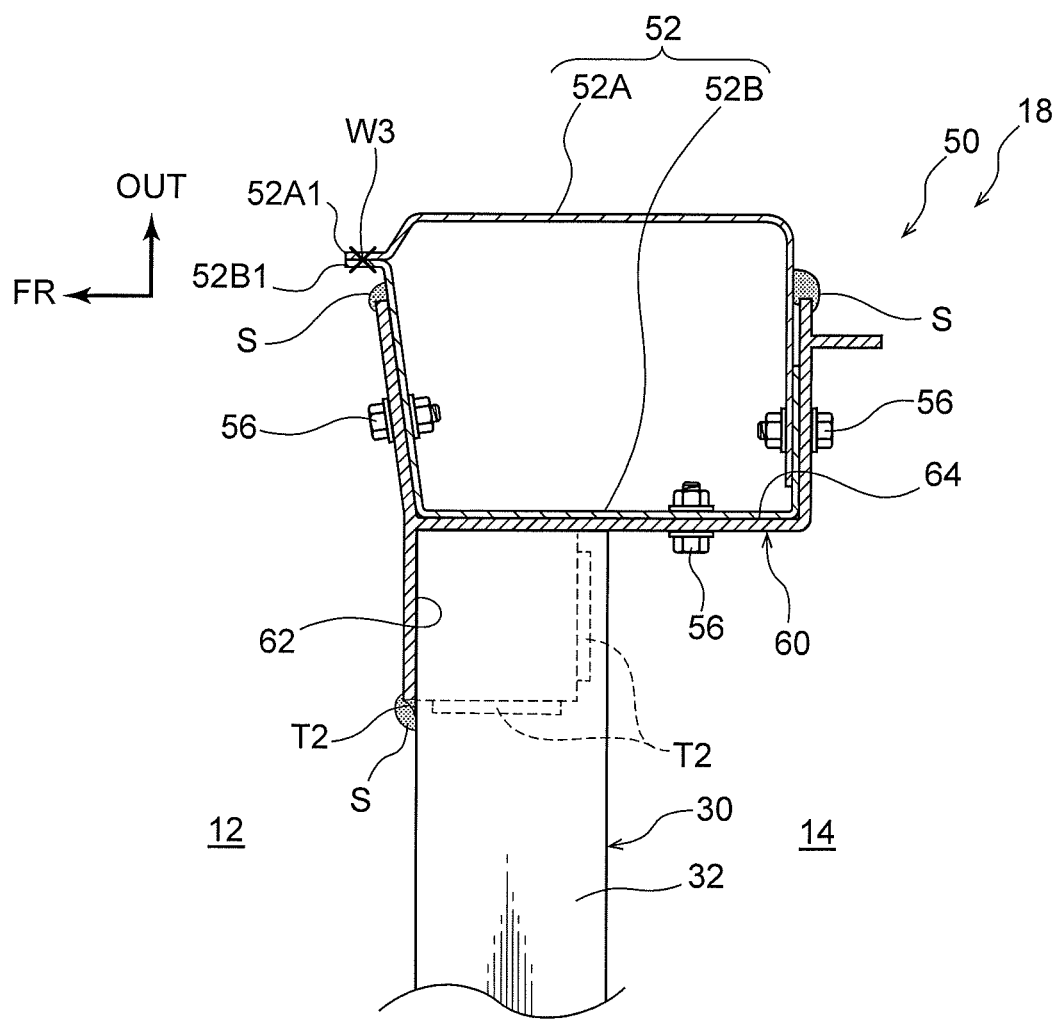
FIG. 3 is a plan view cross-section (a cross-section taken along B-B in FIG. 1) of a cowl section and a front pillar of a pillar framework structure according to an exemplary embodiment of the present disclosure.

Explanation follows regarding a pillar framework structure according to an exemplary embodiment of the present disclosure, with reference to FIG. 1 to FIG. 3. In each of the drawings, the arrow FR indicates a vehicle front direction, the arrow UP indicates a vehicle upward direction, and the arrow OUT indicates a vehicle width direction outer side. A front section of a vehicle is configured with basic left-right symmetry, and so only the right of the vehicle is illustrated and described.

FIG. 1 and FIG. 2 illustrate a cowl section 16 and a front pillar 50 of a vehicle 10 applied with a pillar framework structure 18. Note that windshield glass 20 is omitted from illustration in FIG. 1. The cowl section 16 of the vehicle 10 is provided between the front pillars 50, these being pillars at both vehicle width direction ends of the cowl section 16. As illustrated in FIG. 1 and FIG. 2, the cowl section 16 is configured including a cowl top panel 22 that supports the windshield glass 20, and cowl reinforcement 30 that is joined to a vehicle lower side of the cowl top panel 22. A dash panel 40 that partitions a front vehicle compartment 12 from a vehicle cabin 14 (see FIG. 2) is joined to the vehicle lower side of the cowl reinforcement 30. The front vehicle compartment 12 includes an engine compartment in which an internal combustion engine is housed, and a space in which a drive source, such as a motor for an electric vehicle, is housed. The cowl top panel 22, the cowl reinforcement 30, and the dash panel 40 extend along the vehicle width direction, and are linked to the front pillars 50 at both vehicle width direction ends.

As illustrated in FIG. 1, each front pillar 50 is configured including a front pillar lower (pillar lower) 54, which is a member extending in the vehicle vertical direction, and a joining member 60 to which an upper portion of the front pillar lower 54 is joined. The front pillar 50 is also configured including a front pillar upper (pillar upper) 52 that is joined to the joining member 60. Note that the front pillar upper 52 extends in the vehicle vertical direction at a location joined to the joining member 60, and a section on the vehicle upper side of this joining location, where the front pillar upper 52 supports the windshield glass 20, extends toward the vehicle rear and the vehicle upward upper side. The joining member 60 to which the front pillar upper 52 and the front pillar lower 54 are joined is a die-cast aluminum member. The joining member 60 includes an extension portion 62 into which the cowl reinforcement 30 is inserted, an upper joining portion 64 into which the front pillar upper 52 is inserted, and a lower joining portion 66 into which the front pillar lower 54 is inserted. In the present exemplary embodiment, the upper joining portion 64 and the lower joining portion 66 are formed so as to be continuous with one another in the vehicle vertical direction, and the joining member 60 is open at the vehicle width direction outer side.

The front pillar upper 52 is a framework member with a closed cross-section structure formed by joining together a pillar outer upper 52A with a hat-shaped cross-section profile opening toward the vehicle width direction inner side, and a pillar inner upper 52B with a hat-shaped cross-section profile opening toward the vehicle width direction outer side. A flange 52A1 (see FIG. 3) is formed at a vehicle front end of the pillar outer upper 52A, and another flange (not illustrated in the drawings) is formed at a vehicle rear end of the pillar outer upper 52A. A flange 52B1 (see FIG. 3) is formed at a vehicle front end of the pillar inner upper 52B, and another flange (not illustrated in the drawings) is formed at a vehicle rear end of the pillar inner upper 52B. The flange 52A1 and the flange 52B1 are joined together by spot welding (see weld point W3), and the other flange of the pillar outer upper 52A and the other flange of the pillar inner upper 52B are also joined together by spot welding. The front pillar upper 52 that has a closed cross-section structure is formed in this manner.

FIG. 3 is a plan view cross-section illustrating the front pillar 50 as viewed from above the vehicle. The front pillar upper 52 is inserted into the upper joining portion 64 provided at the vehicle upper side of the joining member 60 along an insertion direction (vehicle vertical direction), and is fixed to the joining member 60 by fastening with plural bolts 56. The upper joining portion 64 is a structure with a U-shaped cross-section profile opening toward the vehicle width direction outer side as viewed from the vehicle upper side. An outer wall face of the pillar inner upper 52B of the front pillar upper 52 is joined to an inner wall face of the upper joining portion 64 in an abutting state. Note that at the portion of the front pillar upper 52 inserted into the joining member 60, the pillar outer upper 52A and the pillar inner upper 52B are joined together in the following manner. Namely, the flange 52A1 and the flange 52B1 are joined together by spot welding at a vehicle front end of the front pillar upper 52. At a vehicle rear end of the front pillar upper 52, plates extending in the vehicle width direction are overlapped with one another and fastened together using a bolt 56 located at the vehicle rear side.

The front pillar lower 54 is a framework member with a closed cross-section structure formed by joining together a pillar outer lower MA with a hat-shaped cross-section profile opening toward the vehicle width direction inner side, and a pillar inner lower 54B with a hat-shaped cross-section profile opening toward the vehicle width direction outer side (see FIG. 1). Flanges are formed at both vehicle front-rear direction ends of both the pillar outer lower 54A and the pillar inner lower 54B. The flanges of the pillar outer lower 54A and the flanges of the pillar inner lower 54B are joined together by spot welding, thereby forming the front pillar lower 54 with a closed cross-section structure. The front pillar lower 54 is inserted into the lower joining portion 66 provided at the vehicle lower side of the joining member 60 along an insertion direction (the vehicle vertical direction), and is fixed to the joining member 60 by welding. As illustrated in FIG. 1, an arc-welded weld portion T1 is formed at a step portion formed by an outer wall face of the front pillar lower 54 (pillar inner lower 54B) and an end face of the joining member 60. The lower joining portion 66 is a structure with a U-shaped cross-section profile opening toward the vehicle width direction outer side as viewed from the vehicle lower side. An outer wall face of the pillar inner lower 54B of the front pillar lower 54 is joined to an inner wall face of the lower joining portion 66 in an abutting state.

At the portion of the front pillar lower 54 that is inserted into the joining member 60, the pillar outer lower 54A and the pillar inner lower 54B are joined together in the following manner. Namely, flanges are joined together by spot welding at a vehicle front end of the front pillar lower 54, and plates extending in the vehicle width direction are overlapped with one another and joined together by welding or the like at a vehicle rear end of the front pillar lower 54.

The joining member 60 includes the extension portion 62 that extends toward the vehicle width direction inner side, and that has a U-shaped cross-section profile as viewed from the vehicle width direction inner side. More specifically, the extension portion 62 includes wall faces at a vehicle upper side, a vehicle front side, and a vehicle lower side, and is open toward the vehicle rear side (see FIG. 2). The cowl reinforcement 30 is inserted into the extension portion 62 provided at the vehicle width direction inner side of the joining member 60 along an insertion direction (vehicle width direction), and is fixed to the joining member 60. As illustrated in FIG. 2 and FIG. 3, the cowl reinforcement 30 is fixed to the extension portion 62 by welding in a state in which an outer wall face of a wall 32 of the cowl reinforcement 30 has been abutted against an inner wall face of the extension portion 62. Accordingly, arc-welded weld portions T2 are formed at steps formed by the outer wall face of the wall 32 and end faces of the extension portion 62. Note that the extension portion 62 that has a U-shaped cross-section profile is not limited to having a profile opening toward the vehicle rear side as in the present exemplary embodiment. For example, the extension portion 62 may have a profile opening toward any of the vehicle front side, the vehicle upper side, or the vehicle lower side.

As illustrated in FIG. 1 and FIG. 2, the cowl top panel 22 is a member with an open cross-section structure, and extends in the vehicle width direction along a lower portion of the windshield glass 20. The cowl top panel 22 includes a lower flange 22A that is joined to the cowl reinforcement 30, and an upright portion 22B that extends from a vehicle front end of the lower flange 22A toward the windshield glass 20 (vehicle upper side). The cowl top panel 22 also includes a mount 22C that extends from a vehicle upper end of the upright portion 22B toward the vehicle front, and that is bent toward the vehicle downward direction at a vehicle front end. The mount 22C is formed as a support portion for the windshield glass 20. The cowl top panel 22 also includes a front flange 22D that extends from a vehicle front and vehicle lower end of the mount 22C toward the vehicle front. The front flange 22D forms a portion that is joined to a reinforcement panel 24 (see FIG. 2), described later.

As illustrated in FIG. 2, the cowl top panel 22 is provided with a fixing portion 26 and cushioning rubber 28 at a vehicle upper side face of the mount 22C. The fixing portion 26 is configured by a pliable and elastic adhesive such as a urethane adhesive, and is provided around a periphery of the windshield glass 20. In the above manner, the windshield glass 20 is supported by the cowl top panel 22 through the fixing portion 26 and the cushioning rubber 28.

The reinforcement panel 24 is joined to the cowl top panel 22 at plural locations in the vehicle width direction. The reinforcement panel 24 is configured including a rear flange 24A extending in the vehicle vertical direction at the vehicle rear, and a front flange 24B extending in the vehicle front-rear direction at the vehicle front. The rear flange 24A is abutted against the upright portion 22B of the cowl top panel 22, and the rear flange 24A and the upright portion 22B are fixed together by spot welding (see the weld point W1 in FIG. 2). The front flange 24B is abutted against the front flange 22D of the cowl top panel 22, and the front flange 24B and the front flange 22D are fixed together by spot welding (see the weld point W2 in FIG. 2).

As illustrated in FIG. 1 and FIG. 2, the cowl reinforcement 30 is a framework member that extends in the vehicle width direction and has a closed cross-section structure. The cowl reinforcement 30 is configured by an extruded aluminum member. A vehicle width direction outer side of the cowl reinforcement 30 is joined to the joining member 60 configuring the front pillar 50, a vehicle upper side of the cowl reinforcement 30 is joined to the cowl top panel 22, and a vehicle lower side of the cowl reinforcement 30 is joined to the dash panel 40.

The lower flange 22A of the cowl top panel 22 is fixed to a vehicle upper side face of the cowl reinforcement 30 by rivets 36. The wall 32 and the extension portion 62 of the joining member 60 are joined together in an overlapping state at a vehicle width direction outer side end of the cowl reinforcement 30 (see FIG. 2). Accordingly, the lower flange 22A of the cowl top panel 22 is abutted against a vehicle upper side face of the wall 32 at the vehicle width direction inner side of the extension portion 62, and is abutted against a vehicle upper side face of the extension portion 62 at the portion where the wall 32 and the extension portion 62 overlap each other. Namely, at the portion where the wall 32 and the extension portion 62 overlap each other, the cowl top panel 22 is joined to the cowl reinforcement 30 together with the joining member 60. Note that the method for joining the cowl reinforcement 30 and the cowl top panel 22 together is not limited to the rivets 36. For example, a joining method employing bolts or welding may be applied.

An upper flange 40A, provided at a vehicle upper side end of the dash panel 40, is fixed to a vehicle lower side face of the cowl reinforcement 30 by bolts 38. The upper flange 40A of the dash panel 40 is abutted against a vehicle lower side face of the wall 32 at the vehicle width direction inner side of the extension portion 62, and is abutted against a vehicle lower side face of the extension portion 62 at the portion where the wall 32 and the extension portion 62 overlap each other. Namely, at the portion where the wall 32 and the extension portion 62 overlap each other, the dash panel 40 is joined to the cowl reinforcement 30 together with the joining member 60. Note that the method for joining the cowl reinforcement 30 and the dash panel 40 together is not limited to the bolts 38. For example, a joining method employing rivets or welding may be applied.

The cowl section 16 and the front pillar 50 in which the various members are joined as described above are coated with a sealant S at each joining portion, thereby preventing water and the like from penetrating through from the front vehicle compartment 12 to the vehicle cabin 14.

Operation and Advantageous Effects

Next, explanation follows regarding operation and advantageous effects of the present exemplary embodiment, while drawing comparison with a comparative example of related technology.

In the pillar framework structure 18 of the present exemplary embodiment configured as described above, the joining member 60 that configures a node of an aluminum die-cast structure is set at a location where the cowl reinforcement 30, this being a framework member, the front pillar upper 52, and the front pillar lower 54 are joined together. Namely, the cowl reinforcement 30, the front pillar upper 52, and the front pillar lower 54 are joined to one another through the joining member 60.

Figure 5:
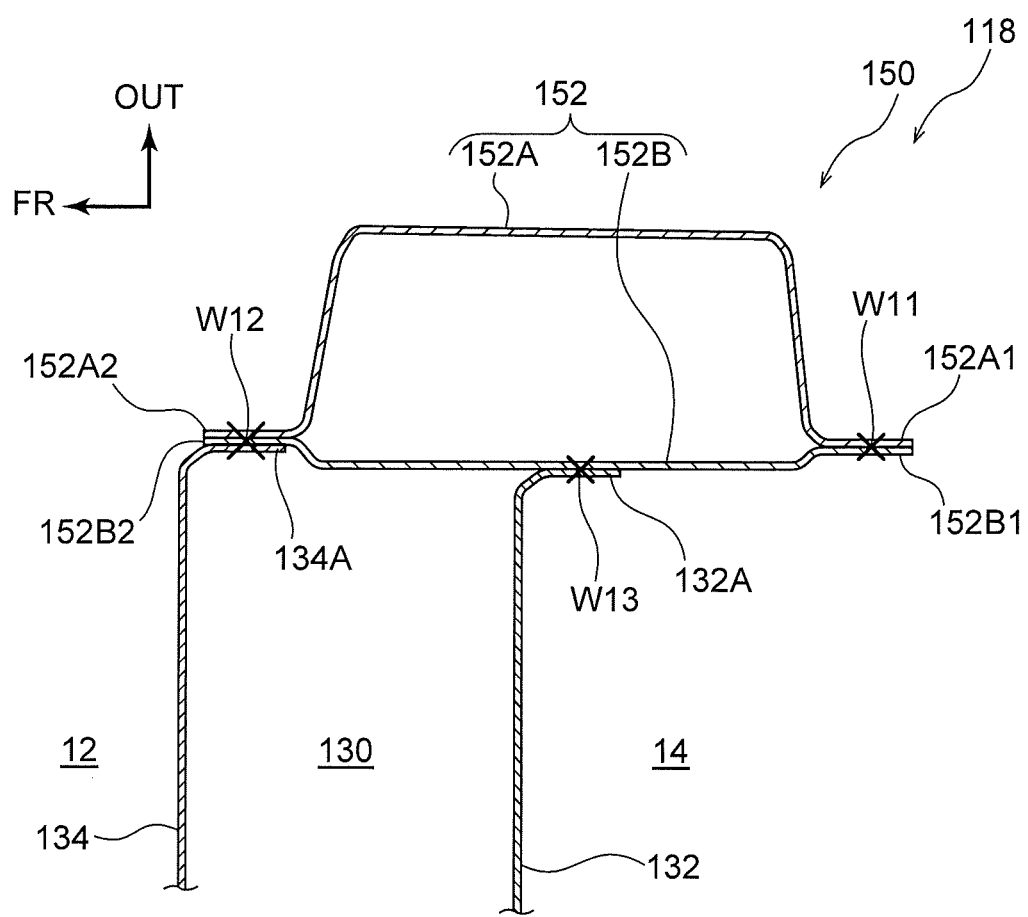
FIG. 5 is a plan view cross-section of a cowl section and a front pillar of a pillar framework structure according to a comparative example.

In contrast thereto, in a comparative example, a cowl reinforcement, a front pillar upper, and a front pillar lower are joined together by flanges. FIG. 5 illustrates a pillar framework structure 118 of the comparative example. A front pillar 150 of the comparative example is configured including a front pillar lower (not illustrated in the drawings) configuring a member extending in the vehicle vertical direction, and a front pillar upper 152 that is joined to the front pillar lower by spot welding. The front pillar 150 is also configured including cowl reinforcement 132 joined to the front pillar upper 152.

The front pillar upper 152 is a framework member with a closed cross-section structure formed by joining together a pillar outer upper 152A that has a hat-shaped cross-section profile opening toward the vehicle width direction inner side, and a substantially plate shaped pillar inner upper 152B. Flanges 152A1, 152A2 are formed at the two vehicle front-rear direction ends of the pillar outer upper 152A. Flanges 152B1, 152B2 are formed at the two vehicle front-rear direction ends of the pillar inner upper 152B. The flange 152A1 and the flange 152B1 are joined together by spot welding (see weld point W11), and the flange 152A2 and the flange 152B2 are joined together by spot welding (see weld point W12), thereby forming the front pillar upper 152 with a closed cross-section structure.

Although not illustrated in the drawings, the front pillar lower is a framework member with a closed cross-section structure formed by joining together a pillar outer lower with a hat-shaped cross-section profile opening toward the vehicle width direction inner side, and a substantially plate shaped pillar inner lower.

Moreover, in the comparative example, the cowl reinforcement 132 and a dash panel 134 are joined together to form a closed cross-section portion 130 that has a closed cross-section. A vehicle width direction outer side end of the cowl reinforcement 132 is formed with a flange 132A. The flange 132A is joined to the pillar inner upper 152B by spot welding (see weld point W13), thereby fixing the cowl reinforcement 132 to the pillar inner upper 152B. A vehicle width direction outer side end of the dash panel 134 is formed with a flange 134A. The flange 134A is joined to both the flange 152A2 and the flange 152B2 by spot welding (see weld point W12), thereby fixing the dash panel 134 to the front pillar upper 152.

The present exemplary embodiment exhibits the following operation and advantageous effects in comparison to the comparative example of the related technology configured as described above.

In the pillar framework structure 118 of the comparative example, the front pillar upper 152 and the front pillar lower (not illustrated in the drawings) configuring framework members are joined together directly by spot welding. In the comparative example, the spot welding locations are weak points from the perspective of securing coupling rigidity.

However, in the pillar framework structure 18 of the present exemplary embodiment, the front pillar upper 52 and the front pillar lower 54 are joined together in the vehicle vertical direction through the die-cast aluminum joining member 60 that configures a node. More specifically, the front pillar upper 52 and the upper joining portion 64, and the front pillar lower 54 and the lower joining portion 66, are each joined together in an overlapping state (what is referred to as shear coupling). Namely, in the present exemplary embodiment, the front pillar upper 52 and the front pillar lower 54 are joined to the joining member 60 in a shear direction (the vehicle front-rear direction and the vehicle width direction), thereby enabling coupling rigidity to be improved.

In the pillar framework structure 118 of the comparative example, the cowl reinforcement 132 configuring a framework member is joined to the pillar inner upper 152B through the flange 132A. Namely, the comparative example employs a coach joint using the flange, and the flange forms a weak point from the perspective of securing coupling rigidity when lateral force acts in the vehicle width direction.

However, in the pillar framework structure 18 of the present exemplary embodiment, the wall 32 of the cowl reinforcement 30 and the extension portion 62 of the joining member 60 are joined together in an overlapping state (what is referred to as shear coupling) in the vehicle width direction. Namely, in the present exemplary embodiment, the cowl reinforcement 30 is joined to the joining member 60 in a shear direction (the vehicle front-rear direction and the vehicle vertical direction), thereby enabling coupling rigidity to be improved.

Figure 4:
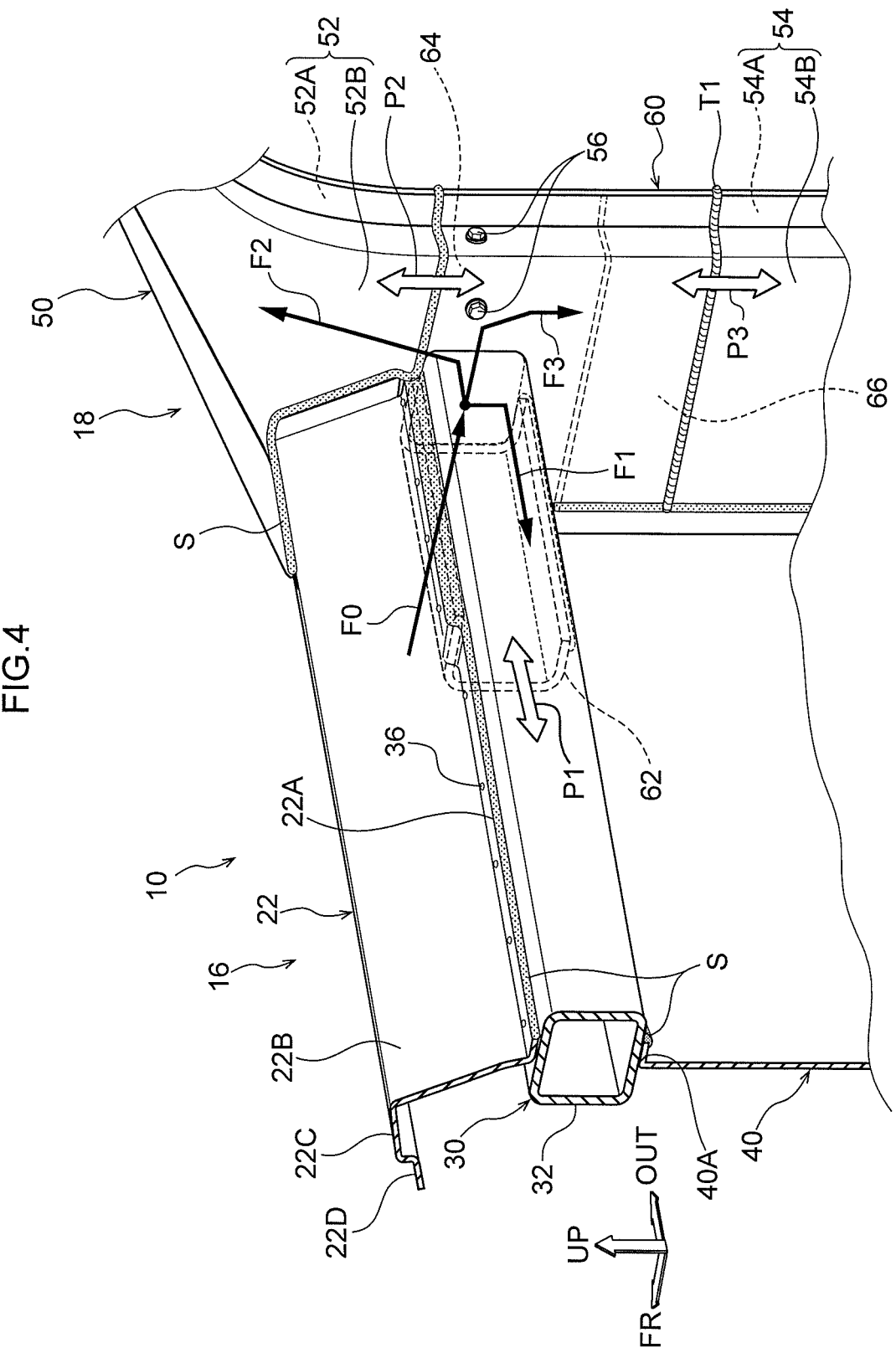
FIG. 4 is an explanatory diagram illustrating operation of a pillar framework structure according to an exemplary embodiment of the present disclosure.

Moreover, in the present exemplary embodiment, due to improving the coupling rigidity between the framework members, collision load can be dispersed between the members in a collision of the vehicle 10. For example, in a frontal collision of the vehicle 10, as illustrated in FIG. 4, collision load F0 is input to the front pillar 50. When this occurs, collision load F1, this being a portion of the collision load F0 that is input to the cowl reinforcement 30, collision load F2, this being a portion of the collision load F0 that is input to the front pillar upper 52, and collision load F3, this being a portion of the collision load F0 that is input to the front pillar lower 54, are each input. Namely, in the pillar framework structure 18 of the present exemplary embodiment, the load acting on the front pillar 50 can be dispersed to the each of the framework members. This thereby enables occupant space in the vehicle cabin 14 to be secured in a collision of the vehicle 10.

Moreover, the positions of joins are easy to adjust in the pillar framework structure 18 of the present exemplary embodiment. In the comparative example, it would be necessary to adjust the positions abutted by the flanges in order to adjust the positions of the joins between the framework members. For example, as illustrated in FIG. 5, when joining the cowl reinforcement 132 to the pillar inner upper 152B, it would be necessary to adjust the position where the flange 132A abuts the pillar inner upper 152B. Such adjustment would require fixing tools such as a welding jig. On the other hand, in the present exemplary embodiment, the positions of joins can be easily adjusted by adjusting the positions of the framework members inserted into the joining member 60 along the insertion direction. For example, as illustrated in FIG. 4, in the case of the cowl reinforcement 30, the joining position of the cowl reinforcement 30 can be adjusted by adjusting the position of the cowl reinforcement 30 in the vehicle width direction (see arrow P1), this being the direction of insertion into the extension portion 62. Moreover, in the case of the front pillar upper 52, the joining position of the front pillar upper 52 can be adjusted by adjusting the position of the front pillar upper 52 in the vehicle vertical direction (see arrow P2), this being the direction of insertion into the upper joining portion 64. In the case of the front pillar lower 54, the joining position of the front pillar lower 54 can be adjusted by adjusting the position of the front pillar lower 54 in the vehicle vertical direction (see arrow P3), this being the direction of insertion into the lower joining portion 66.

Note that the extension portion 62 is a configuration member with a U-shaped cross-section profile opening toward the vehicle rear side as viewed from the vehicle width direction inner side. Accordingly, the cowl reinforcement 30 can be inserted from the vehicle rear as well as from the vehicle width direction inner side, this being the direction of insertion into the extension portion 62. When actually joining the cowl reinforcement 30 to the extension portion 62, a worker inserts the cowl reinforcement 30 from the vehicle rear and is then able to adjust the position by moving the cowl reinforcement 30 in the vehicle width direction (see arrow P1). Moreover, the upper joining portion 64 is a configuration member with a U-shaped cross-section profile opening toward the vehicle width direction outer side as viewed from the vehicle upper side. Accordingly, the front pillar upper 52 can be inserted from the vehicle width direction outer side as well as from the vehicle upper side, this being the direction of insertion into the upper joining portion 64. When actually joining the front pillar upper 52 to the upper joining portion 64, a worker inserts the front pillar upper 52 from the vehicle width direction outer side, and is then able to adjust the position by moving the front pillar upper 52 in the vehicle vertical direction (see arrow P2). Moreover, the lower joining portion 66 is a configuration member with a U-shaped cross-section profile opening toward the vehicle width direction outer side as viewed from the vehicle lower side. Accordingly, the front pillar lower 54 can be inserted from the vehicle width direction outer side as well as from the vehicle lower side, this being the direction of insertion into the lower joining portion 66. When actually joining the front pillar lower 54 to the lower joining portion 66, a worker inserts the front pillar lower 54 from the vehicle width direction outer side, and is then able to adjust the position by moving the front pillar lower 54 in the vehicle vertical direction (see arrow P3). As described above, the pillar framework structure 18 according to the present exemplary embodiment enables the framework members to be inserted into the joining member 60 from plural directions, thereby facilitating assembly.

Vehicle Body Module Structure

The pillar framework structure 18 of the present exemplary embodiment may be applied to a vehicle body module structure 70 including plural vehicle body modules. For example, application may be made to a vehicle body module structure configured by an underside module formed from a floor module, a front module, and a rear module, and a roof module joined to the underside module from above. FIG. 6 illustrates an example of a vehicle body module structure 70. A roof module 72 is formed by assembling the front pillar upper 52 and the cowl top panel 22 together in advance. An underside module 74 is formed by assembling the front pillar lower 54, the cowl reinforcement 30, the dash panel 40, and the joining member 60 together in advance. In such a configuration, the roof module 72 and the underside module 74 are fastened together by plural bolts 56, and as illustrated in FIG. 6, the front pillar upper 52 and the joining member 60 are joined together to form the front pillar 50. The cowl top panel 22 is fixed to the cowl reinforcement 30 using the rivets 36 to form the cowl section 16. Note that the windshield glass 20 may be mounted to the roof module 72 in advance, or may be mounted after the roof module 72 and the underside module 74 have been joined together.

Applying the pillar framework structure 18 of the present exemplary embodiment to the vehicle body module structure 70 as described above enables the following advantageous effects to be obtained. Namely, the vehicle body module structure 70 enables the front pillar 50 and the cowl section 16 to be formed at the same time as the respective vehicle body modules are joined together. In particular, the vehicle (vehicle body) 10 is formed by fixing the joining member 60 in advance to either the front pillar upper 52 or the front pillar lower 54 by welding, and then fastening the other out of the front pillar upper 52 or the front pillar lower 54 to the joining member 60 using bolts 56. This thereby enables a reduction in the number of manufacturing processes of the vehicle. The vehicle body module structure 70 also exhibits the advantageous effects of the pillar framework structure 18 described above. Namely, the coupling rigidity of the framework members including the pillar upper and the pillar lower is improved, and collision load can be dispersed between the respective framework members in a collision.

Note that in the vehicle body module structure 70 described above, the underside module 74 is formed by welding the front pillar lower 54 and the joining member 60 together in advance. However, there is no limitation thereto, and the roof module 72 may be formed by joining the joining member 60 to the front pillar upper 52 in advance. In such cases, the cowl reinforcement 30 is included in the roof module 72.

Supplementary Explanation

Note that in the present exemplary embodiment, the cowl reinforcement 30 is inserted into the extension portion 62 of the joining member 60. More specifically, the outer wall face of the cowl reinforcement 30 and the inner wall face of the extension portion 62 are fixed together in an abutted state. However, there is no limitation thereto, and configuration may be made in which the extension portion 62 is inserted into the cowl reinforcement 30, namely an inner wall face of the cowl reinforcement 30 and an outer wall face of the extension portion 62 are fixed together in an abutted state.

In the pillar framework structure 18 of the present exemplary embodiment, the front pillar upper 52 is fixed to the joining member 60 using the bolts 56, and the front pillar lower 54 is fixed to the joining member 60 by welding. However, there is no limitation thereto, and methods using bolt fastening, welding, adhesion, or the like may be adopted as the method employed to fix the framework members together.

Note that the joining member 60 may be provided with dividing walls (ribs) to partition the joining member 60 at a vehicle vertical direction central portion into upper and lower parts. This thereby enables the rigidity of the joining member 60 to be further improved.

What is claimed is:

1. A pillar framework structure comprising:
a pillar lower that extends in a vehicle vertical direction;
a joining member that is joined to an upper portion of the pillar lower, and that is configured from die-cast aluminum; and
a pillar upper that is joined to the joining member, and that extends in a vehicle upward direction and a vehicle rearward direction.

2. The pillar framework structure of claim 1, wherein:
the joining member is provided with an extension portion extending toward a vehicle width direction inner side; and
the extension portion is joined to an end portion of a cowl reinforcement extending in a vehicle width direction.

3. The pillar framework structure of claim 2, wherein, in the joining member, each of a lower joining portion that is joined to the pillar lower in a state in which the pillar lower is inserted into the lower joining portion, an upper joining portion that is joined to the pillar upper in a state in which the pillar upper is inserted into the upper joining portion, and the extension portion, which is joined to the cowl reinforcement in a state in which the cowl reinforcement is inserted into the extension portion, is formed with a U-shaped cross-section profile as viewed along a respective insertion direction of the respective portion.

4. The pillar framework structure of claim 3, wherein:
the upper joining portion and the lower joining portion are formed so as to be continuous with one another in the vehicle vertical direction; and
the upper joining portion and the lower joining portion are open toward a vehicle width direction outer side.

5. The pillar framework structure of claim 3, further comprising a weld portion at a step formed by a wall of the cowl reinforcement and an end face of the extension portion.

6. A vehicle body module structure comprising the pillar framework structure of claim 1, wherein:
the vehicle body module structure includes a roof module including the pillar upper and an underside module including the pillar lower, as a plurality of vehicle body modules configuring a vehicle body; and
the roof module and the underside module are fastened together using a bolt to form a pillar that includes the pillar upper and the pillar lower.

7. The vehicle body module structure of claim 6, wherein the vehicle body is formed by:
fixing the joining member to one of the pillar upper or the pillar lower in advance by welding; and
fastening the joining member to the other of the pillar upper or the pillar lower using the bolt.

* * * * *